United States Patent
Bowles et al.

(10) Patent No.: US 11,370,532 B2
(45) Date of Patent: Jun. 28, 2022

(54) LOW DRAG SAIL FAIRING FOR COAXIAL ROTOR

(71) Applicant: LOCKHEED MARTIN CORPORATION, Bethesda, MD (US)

(72) Inventors: Patrick Ormande Bowles, Glastonbury, CT (US); Margaret G. Battisti, Naugatuck, CT (US); Brian Ernest Wake, Monroe, CT (US); Peter F. Lorber, Southbury, CT (US); Byung-Young Min, Trumbull, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 375 days.

(21) Appl. No.: 16/431,341

(22) Filed: Jun. 4, 2019

(65) Prior Publication Data
US 2020/0385107 A1 Dec. 10, 2020

(51) Int. Cl.
*B64C 27/10* (2006.01)
*B64C 7/00* (2006.01)
*B64C 27/82* (2006.01)

(52) U.S. Cl.
CPC .............. *B64C 27/10* (2013.01); *B64C 7/00* (2013.01); *B64C 2027/8236* (2013.01); *B64C 2027/8272* (2013.01); *B64C 2027/8281* (2013.01)

(58) Field of Classification Search
CPC ... B64C 7/00; B64C 27/10; B64C 2027/8236; B64C 2027/8272; B64C 2027/8281
See application file for complete search history.

(56) References Cited

U.S. PATENT DOCUMENTS

| | | | | |
|---|---|---|---|---|
| 2,369,652 | A * | 2/1945 | Avery | B64C 27/82 244/17.13 |
| 2,575,185 | A * | 11/1951 | Mulholland | B64C 3/14 244/35 R |
| 10,232,929 | B2 * | 3/2019 | Bowles | B64C 27/32 |
| 10,899,438 | B2 * | 1/2021 | Hunter | F16J 15/52 |
| 2006/0269411 | A1 * | 11/2006 | Bertolotti | B64C 27/12 416/134 A |
| 2017/0096212 | A1 * | 4/2017 | Florea | B64C 23/00 |
| 2017/0113790 | A1 * | 4/2017 | Bazzani | B64C 7/00 |
| 2017/0225771 | A1 * | 8/2017 | Bowles | B64C 27/32 |
| 2017/0297697 | A1 * | 10/2017 | Moffitt | B64C 27/04 |
| 2018/0305003 | A1 * | 10/2018 | Hunter | B64C 27/32 |

FOREIGN PATENT DOCUMENTS

WO WO-2016053475 A2 * 4/2016 ............. B64D 39/00

OTHER PUBLICATIONS

Wikipedia, "Thickness-to-chord ratio," Mar. 15, 2018, https://en.wikipedia.org/wiki/Thickness-to-chord_ratio (Year: 2018).*

* cited by examiner

*Primary Examiner* — Philip J Bonzell
(74) *Attorney, Agent, or Firm* — Michael Best & Friedrich LLP

(57) ABSTRACT

A rotary wing aircraft and a rotor assembly of a rotary wind aircraft is disclosed. The rotary wing aircraft includes at least one engine, and the rotor assembly is coupled to the at least one engine. The rotor assembly includes a first rotor hub, a second rotor hub, and a shaft fairing between the first rotor hub to the second rotor hub, the shaft fairing defined by a chord that varies between the first rotor hub and the second rotor hub.

19 Claims, 3 Drawing Sheets

LOW DRAG SAIL FAIRING FOR COAXIAL ROTOR

BACKGROUND

The present invention is related to reducing drag or rotary-wing aircraft and, more particularly, to a low drag sail fairing for a coaxial rotor.

A coaxial rotary-wing aircraft includes a pair of rotors mounted one above the other on concentric shafts, with the same axis of rotation, but turning in opposite directions (contra-rotating). The rotors are separated by a sail fairing. The sail fairing has an effect on the drag for airflow between the rotors, thereby limiting forward airspeed. Computational Fluid Dynamics (CFD) showed that a hub having a large flow separation region leads to a higher amount of drag. Accordingly, it is desirable to having a sail fairing that reduces drag to enhance an operational envelope of the rotary wing aircraft.

BRIEF DESCRIPTION

According to an embodiment, a rotor assembly is disclosed. The rotor assembly includes a first rotor hub, a second rotor hub, and a shaft fairing between the first rotor hub to the second rotor hub, the shaft fairing defined by a chord that varies between the first rotor hub and the second rotor hub.

In addition to one or more of the features described herein, an inflection point of the chord length occurs between the first rotor hub and the second rotor hub.

In addition to one or more of the features described herein, an inflection chord length at the inflection point is less than a first chord length at the first rotor hub.

In addition to one or more of the features described herein, a thickness-to-chord ratio of the shaft fairing is constant for each axial cross-section of the shaft fairing.

In addition to one or more of the features described herein, the shaft fairing produces an hour glass shape along the main rotor axis that reduces flow separation at the aft portions of the first and second rotor hubs compared to a shaft fairing having a constant thickness along the main rotor axis.

In addition to one or more of the features described herein, a thickness of the shaft fairing has an inflection point at the location of the inflection point of the chord length.

In addition to one or more of the features described herein, the first rotor hub is an upper rotor hub and the second rotor hub is a lower rotor hub.

In addition to one or more of the features described herein, the shaft fairing is structured to comprise a rotor shaft, the rotor shaft being operatively connected to at least one engine.

According to another embodiment, a rotary wing aircraft is disclosed. The rotary wing aircraft includes at least one engine, and a rotor assembly coupled to the at least one engine. The rotor assembly includes a first rotor hub, a second rotor hub, and a shaft fairing between the first rotor hub to the second rotor hub, the shaft fairing defined by a chord that varies between the first rotor hub and the second rotor hub.

In addition to one or more of the features described herein, an inflection point of the chord length occurs between the first rotor hub and the second rotor hub.

In addition to one or more of the features described herein, an inflection chord length at the inflection point is less than a first chord length at the first rotor hub.

In addition to one or more of the features described herein, a thickness-to-chord ratio of the shaft fairing is constant for each axial cross-section of the shaft fairing.

In addition to one or more of the features described herein, the shaft fairing produces an hour glass shape along the main rotor axis that reduces flow separation at the aft portions of the first and second rotor hubs compared to a shaft fairing having a constant thickness along the main rotor axis.

In addition to one or more of the features described herein, a thickness of the shaft fairing has an inflection point at the location of the inflection point of the chord length.

In addition to one or more of the features described herein, the first rotor hub is an upper rotor hub and the second rotor hub is a lower rotor hub.

In addition to one or more of the features described herein, the shaft fairing is structured to comprise a rotor shaft, the rotor shaft being operatively connected to the at least one engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses are presented herein by way of exemplification and not limitation with reference to the Figures.

Figure 1:
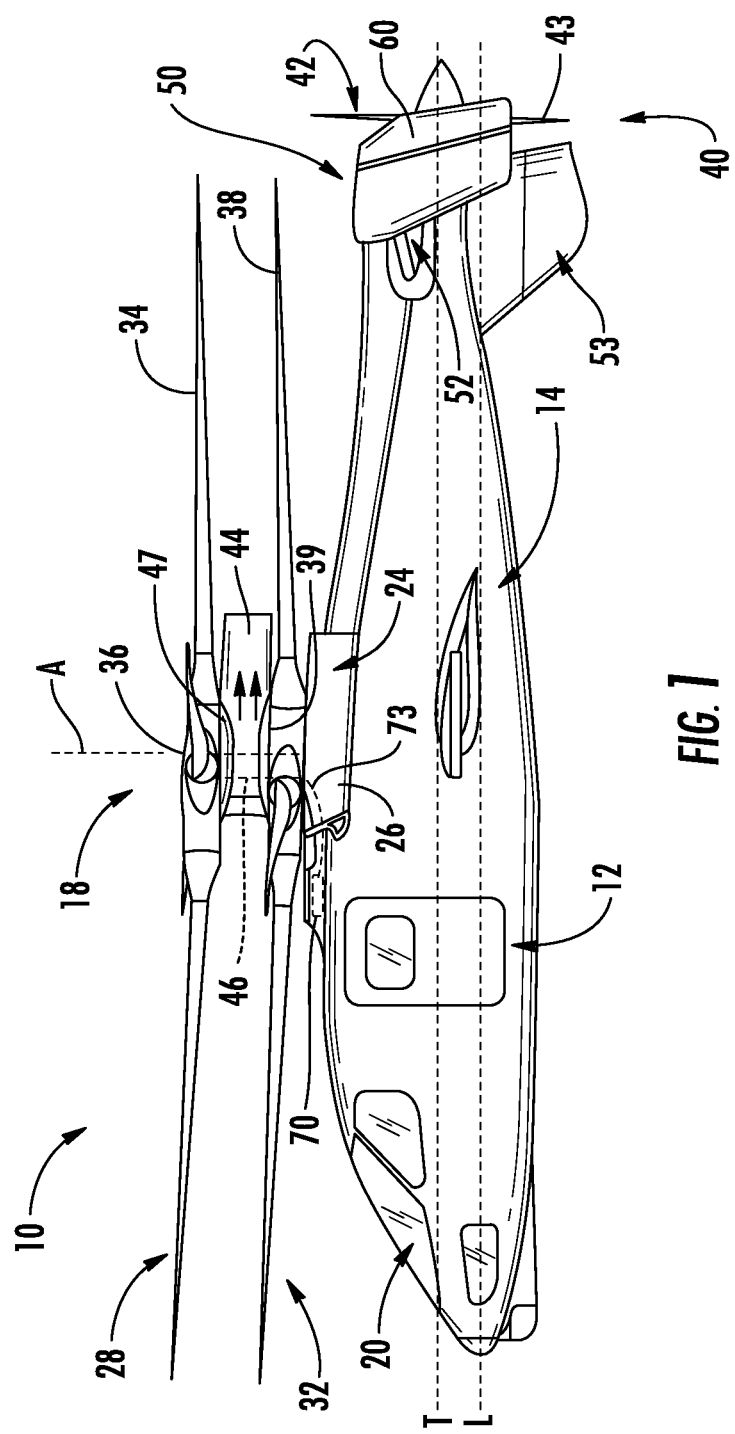
FIG. 1 depicts a rotary wing aircraft in accordance with an exemplary embodiment.
Figure 2:
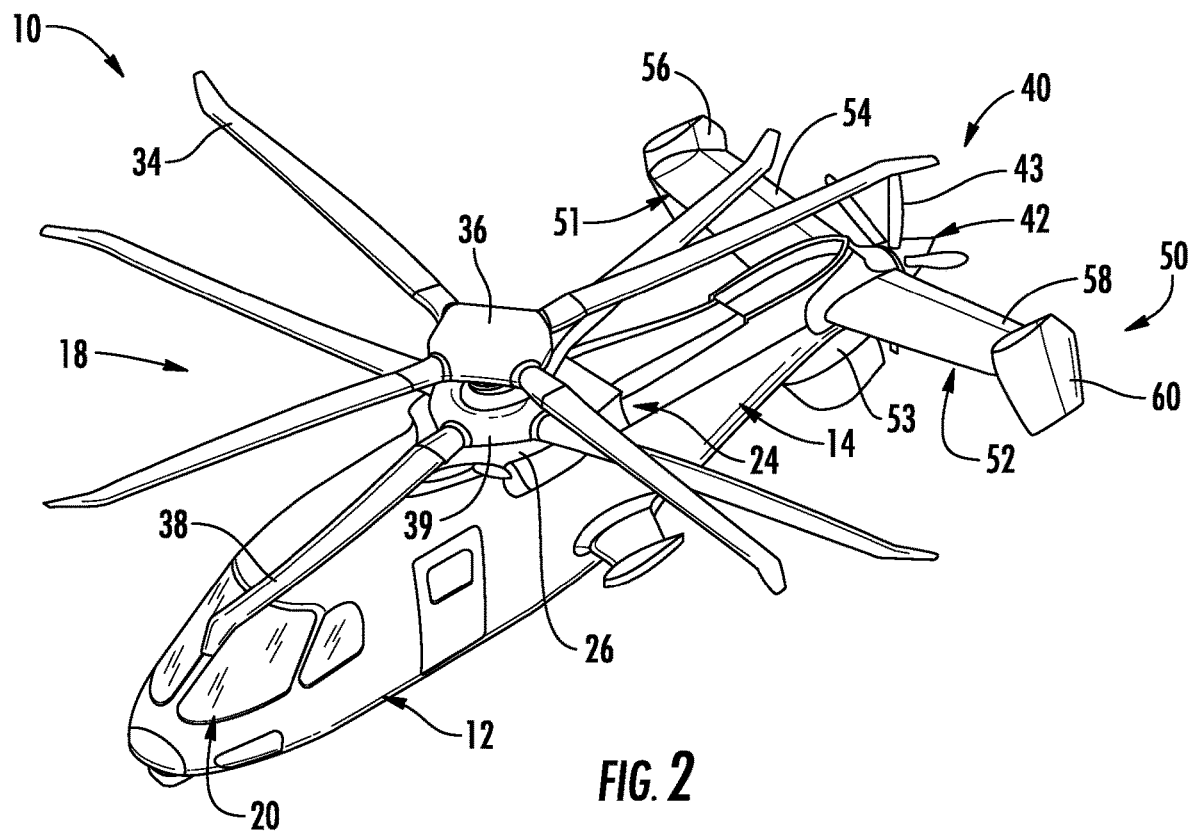
FIG. 2 depicts a perspective view of the rotary wing aircraft of FIG. 1 in accordance with an exemplary embodiment.

Turning now to a description of embodiments, FIGS. 1 and 2 depict an exemplary embodiment of a rotary wing, vertical takeoff and landing (VTOL) aircraft 10. Aircraft 10 includes an airframe or fuselage 12 having a plurality of surfaces (not separately labeled) with an extending tail 14. A coaxial main rotor assembly 18 is located at the fuselage 12 and rotates about a main rotor axis, A. In an exemplary embodiment, the fuselage 12 includes a cockpit 20 having two seats for flight crew (e.g., pilot and co-pilot) and six seats for passengers (not shown). Main rotor assembly 18 is driven by a power source, for example, one or more engines 24, via a gearbox 26. Main rotor assembly 18 includes an upper rotor assembly 28 that may be driven in a first direction (e.g., counter-clockwise) about the main rotor axis, A, and a lower rotor assembly 32 that may be driven in a second direction (e.g., clockwise) about the main rotor axis, A, opposite to the first direction (i.e., counter rotating rotors).

In accordance with an exemplary embodiment, upper rotor assembly 28 includes a first plurality of rotor blades 34 supported by a first or upper rotor hub 36. Lower rotor assembly 32 includes a second plurality of rotor blades 38 supported by a second or lower rotor hub 39. In some embodiments, aircraft 10 may include a translational thrust system 40 having a propeller 42 located at extending tail 14 to provide translational thrust (forward or rearward) for aircraft 10. Propeller 42 includes a plurality of blades 43.

Main rotor assembly 18 also includes a shaft fairing 44 (also referred to as a sail fairing) generally located between and around the upper and lower rotor assemblies 28 and 32 such that lower rotor hub 39 may be at least partially contained therein. Shaft fairing 44 extends about a rotor shaft 46 operatively connecting upper rotor assembly 28 and engine(s) 24. Shaft fairing 44 extends between lower hub 39 and an upper hub member 47 arranged inwardly of upper rotor assembly 28 and operates to reduce drag which might otherwise exist at rotor shaft 46. First plurality of rotor blades 34 may be connected to upper rotor hub 36 in a hingeless manner, also referred to as a rigid rotor system. Similarly, second plurality of rotor blades 38 may be connected to lower rotor hub 39 in a hingeless manner. Although a particular aircraft configuration is illustrated in this non-limiting embodiment, other rotary wing aircraft will also benefit from embodiments of the invention. Although, the dual rotor system is depicted as coaxial, embodiments include dual rotor aircraft having non-coaxial rotors. Further, while a particular aircraft configuration is illustrated in this non-limiting embodiment, other rotary wing aircraft will also benefit from embodiments of the invention.

Propeller 42 or translational thrust system 40 is connected to and driven by the engine 24 via the gearbox 26. Translational thrust system 40 may be mounted to the rear of the fuselage 12 with a translational thrust axis, T, oriented substantially horizontal and parallel to the aircraft longitudinal axis, L, to provide thrust for high-speed flight. The term "parallel" should be understood to include a translational thrust axis that is coincident with the longitudinal axis. Translational thrust axis, T, corresponds to the axis of rotation of propeller 42. While shown in the context of a pusher-prop configuration, it is understood that the propeller 42 could also be a more conventional puller prop or could be variably facing so as to provide yaw control in addition to or instead of translational thrust. It should be further understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

Figure 3:
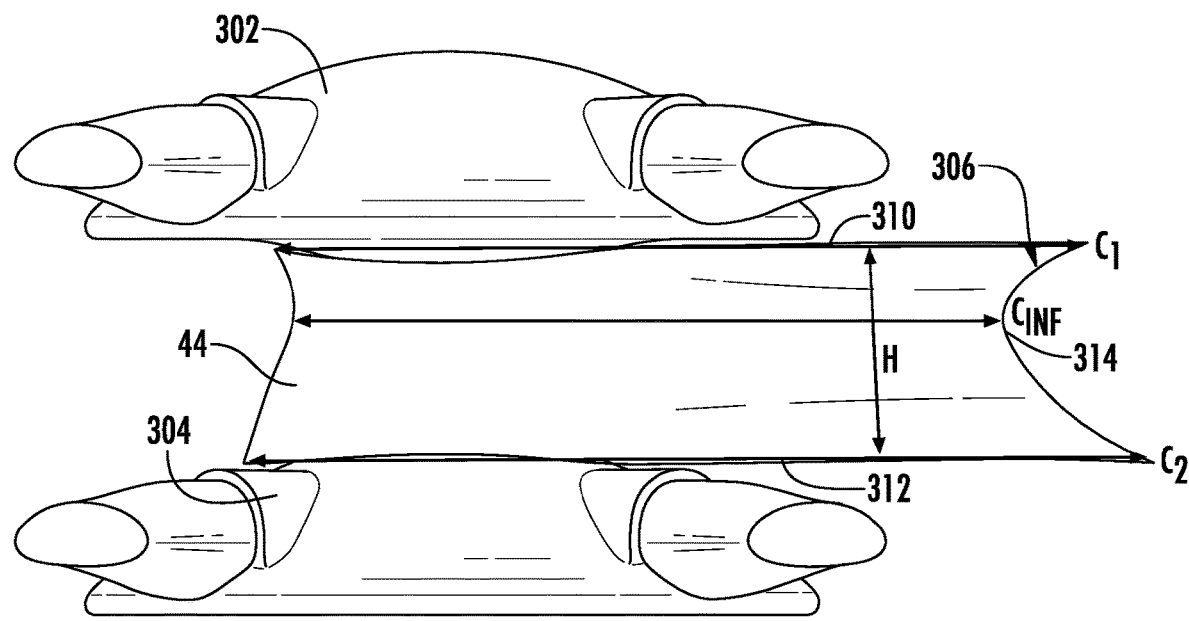
FIG. 3 depicts a side view of the main rotor assembly of the rotary wing aircraft, according to an exemplary embodiment.

FIG. 3 depicts a side view of the main rotor assembly 18, including upper hub 302, lower hub 304 and shaft fairing 44 according to an exemplary embodiment. Blades have been omitted from the rotor assembly of FIG. 3 so as not to obscure the figure. The shaft fairing 44 is located between the upper hub 302 and the lower hub 304 and separates the upper hub 302 from the lower hub 304. The shaft fairing 44 has a height h that extends along the main rotor axis A. A first axial end 310 (i.e., top end) of the shaft fairing 44 is located proximate to the upper hub 302 and a second axial end 312 (i.e., bottom end) of the shaft fairing 44 is located proximate to the lower hub 304.

A length of the shaft fairing 44 is defined by a chord, the chord being a line extending from a front surface of the shaft fairing 44 to a rear edge 306 of the shaft fairing. For the shaft fairing 44 of FIG. 3, the rear edge 306 varies as a function of the distance along the main rotor axis A. A plane perpendicular to the main rotor axis A at a selected location along the main rotor axis A and intersection the shaft fairing 44 defines the chord of the shaft fairing 44 at the selected location. Three chords are shown for illustrative purposes. The first chord has a first chord length $c_1$ and is located at a first axial end 310 of shaft fairing 44. The second chord has a second chord length $c_2$ and is located at a second axial end 312. A third chord has an inflection chord length $c_{inf}$ and is located at an inflection point 314 between the first axial end 310 and the second axial end 312. The inflection point 314 can be located at a midpoint between the first axial end 310 and the second axial end 312 but is not limited to this location in any particular embodiment. As shown in FIG. 3, the inflection point 314 occurs closer to the first axial end 310 than to the second axial end 312.

The inflection point 314 is a location along the main rotor axis A at which a minimum chord length occurs. In the illustrative embodiment of FIG. 3, the first chord length $c_1$ is less than or equal to the chord length $c_2$. However, the first chord length $c_1$ does not have to be less the second chord length $c_2$. In various embodiments, the first chord length $c_1$ can be equal to the second chord length $c_2$ or can be greater than the second chord length $c_2$. The inflection chord length $c_{inf}$ is less than both the first chord length $c_1$ and the second chord length $c_2$. For the example embodiment in FIG. 3, traversing the shaft fairing 44 along the direction of the main rotor axis A, the chord length decreases from $c_1$ at the first axial end 310 to a minimum value $c_{inf}$ at the inflection point 314 and then increases to a maximum value $c_2$ at the second axial end 312.

Figure 4:
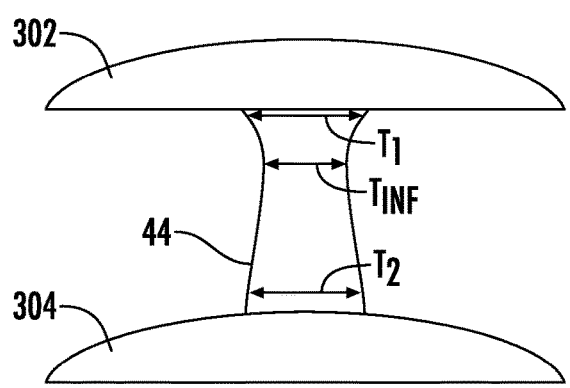
FIG. 4 shows a front view of the main rotor assembly.

FIG. 4 shows a front view of the main rotor assembly 18. As seen from the front view, an outer contour of the shaft fairing 44 produces an hour-glass shape. The thickness t of the shaft fairing 44 changes along the direction of the main rotor axis A. The thickness changes in a manner that maintains a constant thickness-to-chord ratio (t/c) along the direction of the main rotor axis A. For the illustrative embodiment of FIG. 4, the thickest section $t_2$ occurs at the second axial end 312 along with the maximal chord length $c_2$. The minimal thickness $t_{inf}$ corresponds to the minimal chord length $c_{inf}$, thickness t1 corresponds to chord length $c_1$, etc.

The constant thickness-to-chord ratio reduces flow separation along the direction of the main rotor axis A compared to conventional sail fairings which vary the thickness-to-chord ratio along the main rotor axis A. In particular, the conventional sail fairing (having a generally constant thickness along the main rotor axis A) experiences flow separation in the aft portion of lower and upper hubs. The hour glass shape of the sail fairing of the present invention reduces airflow separation at the aft portion of the lower and upper hubs with respect to the airflow present in convention sail fairings. This reduction in flow separation thereby reduces drag in the sail fairing of the present invention compared to these conventional sail fairings.

Although other techniques may have been attempted to solve the problem of drag, the new shaft fairing design according to one or more embodiments can be utilized on top of (i.e., in conjunction with) existing techniques, thereby reducing drag even more. Further, it should be appreciated that the new hub design is a passive design which can be simple to implement, according to one or more embodiments.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor assembly, comprising:
   a first rotor hub;
   a second rotor hub; and
   a shaft fairing between the first rotor hub to the second rotor hub and including a front surface, a rear edge, a first axial end adjacent the first rotor hub, and a second axial end adjacent the second rotor hub, the shaft fairing defined by a chord that extends between the front surface and the rear edge, wherein the chord varies between the first rotor hub and the second rotor hub, and further wherein the shaft fairing defines an inflection point at which a minimum chord length occurs and the inflection point is closer to the first axial end than the second axial end,
   wherein a thickness-to-chord ratio of the shaft fairing is constant for each axial cross-section of the shaft fairing.

2. The rotor assembly of claim 1, wherein the shaft fairing comprises an hour glass shape along the main rotor axis configured to reduce flow separation at the aft portions of the first and second rotor hubs compared to a shaft fairing having a constant thickness along the main rotor axis.

3. The rotor assembly of claim 1, wherein a thickness of the shaft fairing has an inflection point at the location of the inflection point of the minimum chord length.

4. The rotor assembly of claim 1, wherein the first rotor hub is an upper rotor hub and the second rotor hub is a lower rotor hub.

5. The rotor assembly of claim 1, wherein the shaft fairing is structured to comprise a rotor shaft, that operatively connects the first rotor hub and the second rotor hub.

6. The rotary wing aircraft of claim 1, wherein the shaft fairing includes a first chord length at the first rotor hub and a second chord length at the second rotor hub, and the first chord length is less than the second chord length.

7. The rotary wing aircraft of claim 1, wherein the shaft fairing includes a height that is constant from a main rotor axis to the trailing rear edge.

8. The rotary wing aircraft of claim 1, wherein the shaft fairing includes a height that is constant from a main rotor axis to the rear edge.

9. A rotary wing aircraft, comprising:
   at least one engine; and
   a rotor assembly coupled to the at least one engine, the rotor assembly comprising:
   a first rotor hub;
   a second rotor hub; and
   a shaft fairing between the first rotor hub to the second rotor hub and including a front surface, a rear edge, a first axial end adjacent the first rotor hub, and a second axial end adjacent the second rotor hub, the shaft fairing defined by a chord that extends between the front surface and the rear edge, wherein the chord varies between the first rotor hub and the second rotor hub, and further wherein the shaft fairing defines an inflection point at which a minimum chord length occurs and the inflection point is closer to the first axial end than the second axial end,
   wherein a thickness of the shaft fairing has an inflection point at the location of the inflection point of the minimum chord length.

10. The rotary wing aircraft of claim 9, wherein a thickness-to-chord ratio of the shaft fairing is constant for each axial cross-section of the shaft fairing.

11. The rotary wing aircraft of claim 9, wherein the shaft fairing comprises an hour glass shape along the main rotor axis configured to reduce flow separation at the aft portions of the first and second rotor hubs compared to a shaft fairing having a constant thickness along the main rotor axis.

12. The rotary wing aircraft of claim 9, wherein the first rotor hub is an upper rotor hub and the second rotor hub is a lower rotor hub.

13. The rotary wing aircraft of claim 9, wherein the shaft fairing is structured to comprise a rotor shaft, the rotor shaft being operatively connected to the at least one engine.

14. The rotary wing aircraft of claim 9, wherein the shaft fairing includes a first chord length at the first rotor hub and a second chord length at the second rotor hub, and the first chord length is less than the second chord length.

15. The rotary wing aircraft of claim 9, wherein the shaft fairing includes a height that is constant from a main rotor axis to the trailing rear edge.

16. A rotary wing aircraft, comprising:
   at least one engine; and
   a rotor assembly coupled to the at least one engine, the rotor assembly comprising:
   a first rotor hub;
   a second rotor hub; and
   a shaft fairing extends between the first rotor hub and the second rotor hub, the shaft fairing including a front surface, a rear edge, a first axial end adjacent the first rotor hub and a second axial end adjacent the second rotor hub, wherein the shaft fairing is defined by a chord that extends between the front surface and the rear edge and the chord varies between the first axial end and the second axial end, and
   further wherein a first chord length is at the first axial end, a second chord length is at the second axial end, and a third chord length is closer to the first axial end than the second axial end, the third chord length defines an inflection point and a minimum chord length of the shaft fairing, wherein a thickness of the shaft fairing has an inflection point at the location of the inflection point of the minimum chord length.

17. The rotary wing aircraft of claim 16, wherein the first chord length is less than the second chord length.

18. The rotary wing aircraft of claim 16, wherein the shaft fairing comprises an hour glass shape along the main rotor axis configured to reduce flow separation at the aft portions of the first and second rotor hubs compared to a shaft fairing having a constant thickness along the main rotor axis.

19. The rotary wing aircraft of claim 16, wherein a thickness-to-chord ratio of the shaft fairing is constant for each axial cross-section of the shaft fairing.

* * * * *